United States Patent
Lavery

(10) Patent No.: US 9,363,645 B2
(45) Date of Patent: Jun. 7, 2016

(54) LOCATIONING SYSTEM PERFORMANCE IN NON-LINE OF SIGHT CONDITIONS

(71) Applicant: SYMBOL TECHNOLOGIES, INC., Schaumburg, IL (US)

(72) Inventor: Richard J Lavery, Huntington, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 110 days.

(21) Appl. No.: 14/056,257

(22) Filed: Oct. 17, 2013

(65) Prior Publication Data
US 2015/0111597 A1    Apr. 23, 2015

(51) Int. Cl.
| | |
|---|---|
| H04W 24/00 | (2009.01) |
| H04W 4/04 | (2009.01) |
| H04W 64/00 | (2009.01) |
| G01S 5/02 | (2010.01) |
| G01S 5/14 | (2006.01) |
| G01S 5/30 | (2006.01) |

(52) U.S. Cl.
CPC ............... *H04W 4/043* (2013.01); *G01S 5/021* (2013.01); *G01S 5/14* (2013.01); *G01S 5/30* (2013.01); *H04W 64/003* (2013.01)

(58) Field of Classification Search
CPC ....... H04W 64/00; H04W 4/02; H04W 4/025; H04W 4/021; H04W 4/04
USPC .......... 455/456.1, 456.5, 67.11, 67.13, 226.1, 455/226.2
See application file for complete search history.

(56) References Cited

U.S. PATENT DOCUMENTS

| | | | |
|---|---|---|---|
| 5,257,405 | A | 10/1993 | Reitberger |
| 5,949,988 | A * | 9/1999 | Feisullin et al. ................... 703/2 |
| 6,282,426 | B1 * | 8/2001 | Wang .......................... 455/456.3 |
| 6,526,283 | B1 | 2/2003 | Jang |
| 7,271,764 | B2 | 9/2007 | Golden et al. |
| 7,679,561 | B2 | 3/2010 | Elwell, Jr. et al. |
| 8,295,859 | B1 | 10/2012 | Yarkan et al. |
| 2005/0208952 | A1 | 9/2005 | Dietrich et al. |
| 2005/0281363 | A1 * | 12/2005 | Qi et al. ......................... 375/349 |

(Continued)

FOREIGN PATENT DOCUMENTS

| | | |
|---|---|---|
| AU | 2002215307 A2 | 7/2003 |
| AU | 2007334063 A1 | 4/2009 |

(Continued)

OTHER PUBLICATIONS

R. Casas et al, "Robust Estimator for non-Line-of-Sight Error Mitigation in Indoor Localization", Jan. 1, 2006.

(Continued)

*Primary Examiner* — Temica M Beamer

(57) ABSTRACT

An apparatus and method for improved locationing system performance in non-line of sight conditions of a mobile device within an environment includes providing a model of the environment that maps transmitters within and objects that obstruct signals from the transmitters, including mapped areas where the signal from a nearby transmitter is obstructed. A location of a device moving within the environment is tracked using the signals. When it is determined that the device is moving into a mapped area having an obstructed signal from a nearby transmitter, a locationing system parameter is modified for that obstructed signal so that the mobile communication device can be located using at least the modified signal parameter.

13 Claims, 4 Drawing Sheets

(56) References Cited

U.S. PATENT DOCUMENTS

2008/0143603 A1    6/2008  Bornholdt
2013/0253818 A1    9/2013  Sanders et al.

FOREIGN PATENT DOCUMENTS

| | | |
|---|---|---|
| AU | 2008281708 A1 | 2/2010 |
| WO | 2006013512 A1 | 2/2006 |
| WO | 2015057376 | 4/2015 |

OTHER PUBLICATIONS

Jongdae Jung et al, "Indoor Localization Using Particle Filter and Map-Based NLOS Ranging Model", May 9, 2011.

Zhuoling Xia et al., "Identification and Mitigation of Non-line-of-sight Conditions Using Received Signal Strength", Oct. 1, 2013.

* cited by examiner

LOCATIONING SYSTEM PERFORMANCE IN NON-LINE OF SIGHT CONDITIONS

BACKGROUND

An ultrasonic receiver can be used to determine its location with reference to one or more ultrasonic emitters, such as locating a mobile communication device having an ultrasonic receiver and being present within a retail, factory, warehouse, or other indoor environment, for example. Fixed ultrasonic emitter(s) can transmit ultrasonic energy in a short burst which can be received by an ultrasonic transducer (audio microphone) in the ultrasonic receiver. The use of several ultrasonic emitters distributed within the environment can be used to provide a specific location of a particular device using techniques known in the art such as measuring time-of-flight, time difference of arrival, or signal strength of the emitter signals, and then using triangulation, trilateration, and the like, as have been used in radio frequency locationing systems.

However, ultrasonic emitters may not always be in the line-of-sight of the mobile communication device, and typical emitter signals may not be strong enough to directly penetrate through obstacles (herein referred to as attenuators) very well, such that reflected signals may reach the mobile communication device better than a direct signal from the emitter, resulting in various multipath impairments. This leads to inaccurate locationing results and degraded locationing system performance. In addition, having many mobile communication devices trying to establish their position within the environment, and interacting with all the emitters in the environment cannot be done simultaneously since separate emitter signals would interfere with each other, which results in a poor position update rate.

Accordingly, there is a need for a technique to locate a mobile communication device in an indoor environment while eliminating the aforementioned issues. Furthermore, other desirable features and characteristics of the present invention will become apparent from the subsequent detailed description and the appended claims, taken in conjunction with the accompanying drawings and the foregoing background.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
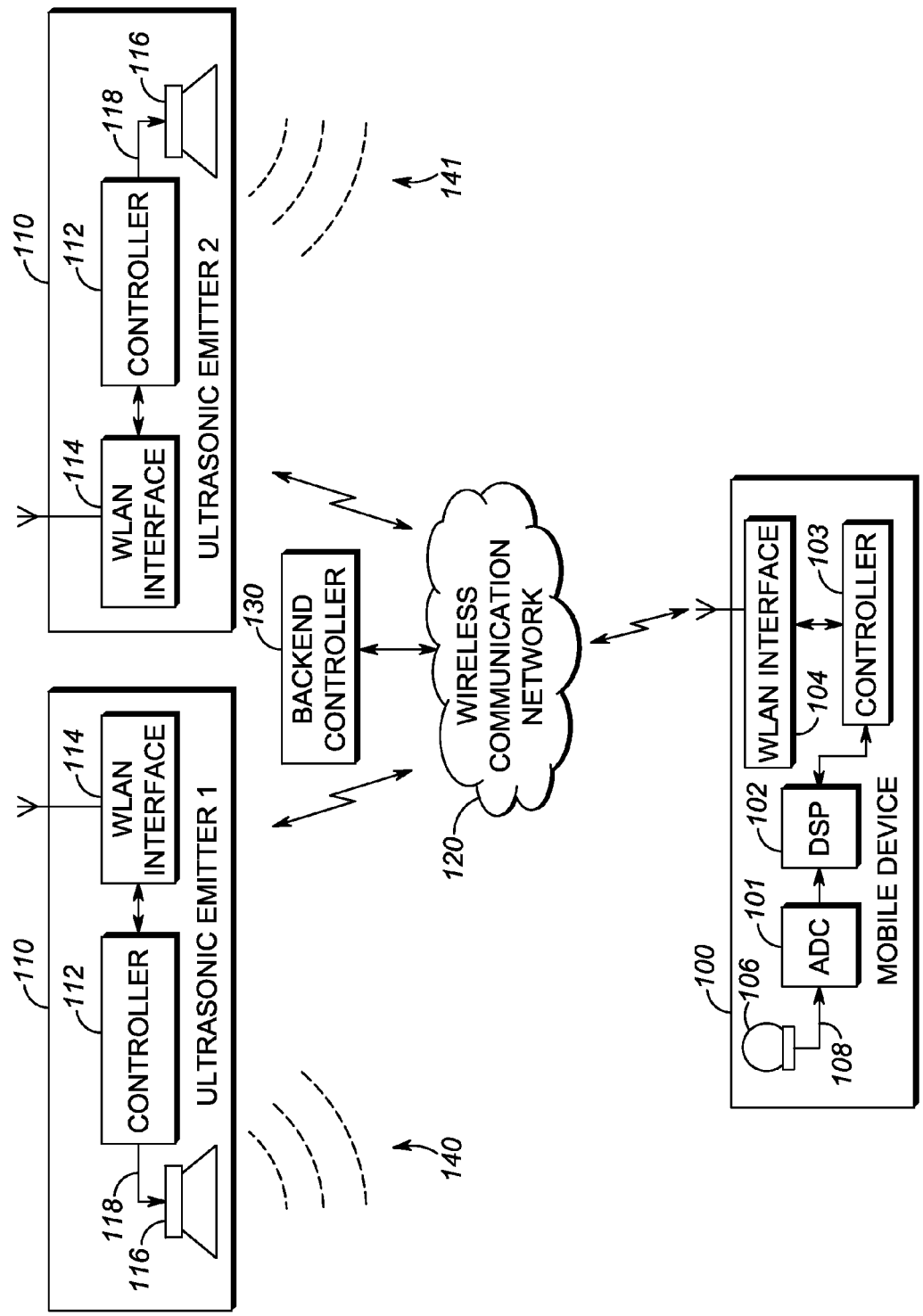
FIG. 1 is a simplified block diagram of an ultrasonic locationing system, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, an improved technique is described to locate a mobile communication device in an indoor environment while reducing problems associated with non-line-of-sight issues, multipath problems, interference, and a poor position update rate, as will be detailed below. Although the invention is described herein in terms of an ultrasonic locationing system, it should be recognized that the present invention is also equally applicable to a radio frequency locationing system.

The device to be located can include a wide variety of business and consumer electronic platforms such as cellular radio telephones, mobile stations, mobile units, mobile nodes, user equipment, subscriber equipment, subscriber stations, mobile computers, access terminals, remote terminals, terminal equipment, cordless handsets, gaming devices, smart phones, personal computers, and personal digital assistants, and the like, all referred to herein as a communication device. Each device comprises a processor that can be further coupled to a keypad, a speaker, a microphone, audio circuitry, a display, signal processors, and other features, as are known in the art and therefore not shown or described in detail for the sake of brevity.

Various entities are adapted to support the inventive concepts of the embodiments of the present invention. Those skilled in the art will recognize that the drawings herein do not depict all of the equipment necessary for system to operate but only those system components and logical entities particularly relevant to the description of embodiments herein. For example, routers, controllers, servers, switches, access points/ports, and wireless clients can all includes separate communication interfaces, transceivers, memories, and the like, all under control of a processor. In general, components such as processors, transceivers, memories, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, and/or expressed using messaging logic flow diagrams.

Thus, given an algorithm, a logic flow, a messaging/signaling flow, and/or a protocol specification, those skilled in the art are aware of the many design and development techniques available to implement one or more processors that perform the given logic. Therefore, the entities shown represent a system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

FIG. 1 is a block diagram of a locationing system, in accordance with the present invention. A plurality of ultrasonic transponders such as a piezoelectric speaker or emitter 116 can be implemented within the environment. Each emitter can send a short burst of ultrasonic sound (e.g. 140, 141) within the environment. The mobile communication device 100 can include a digital signal processor 102 to process the ultrasonic signal 140, received by a transponder such as a microphone 106, from the ultrasonic emitters 116 in accordance with the present invention. In the case of a radio frequency locationing system, the emitters can be replaced with radio frequency (RF) transmit antennas to send an RF locationing or ranging signal or beacon, from a local area network access point for example.

The microphone 106 provides electrical signals 108 to receiver circuitry including a signal processor 102. It is envisioned that the mobile communication device can use existing audio circuitry having typical sampling frequencies of 44.1 kHz, which is a very common sampling frequency for commercial audio devices, which relates to a 22.05 kHz usable upper frequency limit for processing audio signals. It is envisioned that the mobile communication device receiver circuitry is implemented in the digital domain using an analog-to-digital converter 101 coupled to a digital signal processor 102, for example. It should be recognized that other components, including amplifiers, digital filters, and the like, are not shown for the sake of simplicity of the drawings. For example, the microphone signals 108 can be amplified in an audio amplifier after the microphone 106. In the case of a radio frequency locationing system, the microphone can be replaced with RF receive antennas and appropriate RF receiver to receive that RF locationing or ranging signal or beacon, from the local area network access point for example.

The processor 102 can also be coupled to a controller 103 and wireless local area network interface 104 for wireless communication with other devices, and controllers 130 in the communication network 120. Each emitter 110 can be coupled to its own controller 112 and wireless local area network interface 114 for wireless communication with the server or backend controller 130 in the communication network 120 and having its own processor for implementing some of the embodiments of the present invention. Alternatively, either or both of the mobile communication device 100 and emitters 110 could be connected to the communication network 120 through a wireless local area network connection (as shown) or a wired interface connection (not represented), such as an Ethernet interface connection. The wireless communication network 120 can include local and wide-area wireless networks, wired networks, or other IEEE 802.11 wireless communication systems, including virtual and extended virtual networks. However, it should be recognized that the present invention can also be applied to other wireless communication systems. For example, the description that follows can apply to one or more communication networks that are IEEE 802.xx-based, employing wireless technologies such as IEEE's 802.11, 802.16, or 802.20, modified to implement embodiments of the present invention. The protocols and messaging needed to establish such networks are known in the art and will not be presented here for the sake of brevity.

The controller 112 of each ultrasonic emitter 110 provides the speaker 116 with a signal 140, 141 to emit in an ultrasonic burst 140 at a specified time. The speaker will typically broadcast the burst with a duration of about two milliseconds. The particular frequency and timing between subsequent bursts to be used by each emitter 110 can be directed by the backend controller 130 via the network 120. A schedule of this timing information can be provided to the mobile communication device. The emitters are configured to have usable output across about a 19-22 kHz frequency range. In the case of a radio frequency locationing system, the RF transmit antenna can send an RF locationing or ranging signal or beacon, from a local area network access point for example, instead of the ultrasonic signal.

The processor 102 of the mobile communication device 100 is operable to discern the frequency and timing of the tone received in its microphone signal 108. The tone is broadcast within the frequency range of about 19-22 kHz to enable the existing mobile device processor 102 analyze the burst in the frequency domain to detect the tone. The 19-22 kHz range has been chosen such that the existing audio circuitry of the mobile device will be able to detect ultrasonic tones without any users within the environment hearing the tones. In addition, it is envisioned that there is little audio noise in the range of 19-22 kHz to interfere with the ultrasonic tones.

It is envisioned that the processor 102 of the mobile device will use a Fast Fourier Transform (FFT) to discern the burst tones or signals for timing and or received signal strength indicators (RSSI) measurements in the frequency domain. In particular, a Goertzel algorithm can be used to detect timing of the receipt of the tone to be used for flight time measurements. In practice, the mobile device can simply measure the time when it receives signals from two or more different emitters, and supply this timing information to a locationing engine in the backend controller. The backend controller 130 can receive the arrival timing information from the mobile device, and subtract the time that the emitter was directed to emit the burst, in order to determine the flight time of each burst to the mobile device. Given the flight time of different emitter signals to the mobile device along with the known positions of the fixed emitters, the back end controller can determine a location of the mobile device using known trilateration techniques, for example. In another scenario, the mobile device can measure the signal strength of received tones for two or more different emitters, and supply signal strength and timing information to the locationing engine of the backend controller. The back end controller, knowing the time that it directed each emitter to send its tone can then estimate the distance to the mobile device for each emitter's tone, where closer emitters producing stronger tones. Using RSSI techniques, then backend controller can then estimate the location of the mobile device. Alternatively, the mobile device can include the locationing engine in its controller, operable to receive the time that the burst was sent from the backend controller or emitter itself, and subtract that from the time that the mobile device received the burst, in order to determine the flight time of the burst to the mobile device. Given the flight time of different emitter signals to the mobile device along with the known positions of the fixed emitters, the mobile device can determine its own location.

For example, if a device's hardware has the capability to perform more accurate flight time measurements, considering that some mobile devices support more accurate/higher refresh rate modes, then the backend controller can drive emitters to broadcast locationing tones at predefined times for flight time measurements, and a flight time locationing mode can be used by a mobile communication device to measure the timing of those locationing tones, and if a device's hardware only has the capability to perform less accurate signal strength measurements (i.e. received signal strength indicators or RSSI), then the backend controller can drive emitters to broadcast locationing tones for signal strength measurements, and a signal strength locationing mode can be used by that device to measure the signal strength of those locationing tones.

Each emitter is configured to broadcast the burst over a limited coverage area or region. For unobtrusiveness and clear signaling, the emitters can be affixed to a ceiling of the environment, where the position and coverage area of each emitter is known and fixed, with the emitter oriented to emit a downward burst towards a floor of the environment, such that the burst from an emitter is focused to cover only a limited, defined floor space or region of the environment, as has less chance of being obstructed or attenuated.

In practice, it has been determined that one emitter in a typical retail environment can provide a coverage area of about fifty feet square. Therefore, a plurality of emitters 110 is provided to completely cover an indoor environment, and these emitters are spaced in a grid about fifty feet apart. A mobile communication device that enters the environment and associates to the wireless local area network (WLAN) of the backend controller, and is provided a software application to implement the locationing techniques described herein, in accordance with the present invention.

Mobile communication devices benefit from maximum possible refresh rate of its location so that the backend controller will be able to track the movement of the mobile communication device with increased granularity. During locationing, those mobile communication devices that are using flight time measurements are expected to have a position update rate of about every 500 mS (two updates per second for three samples—averaging 1.5 seconds). Those mobile communication devices that are using signal strength measurements are expected to have a position update rate of about every two seconds with three samples—averaging 6 seconds. Each communication device performs its locationing measurements needed by the backend controller using locationing tones broadcast from emitters activated by the backend controller.

Figure 2:
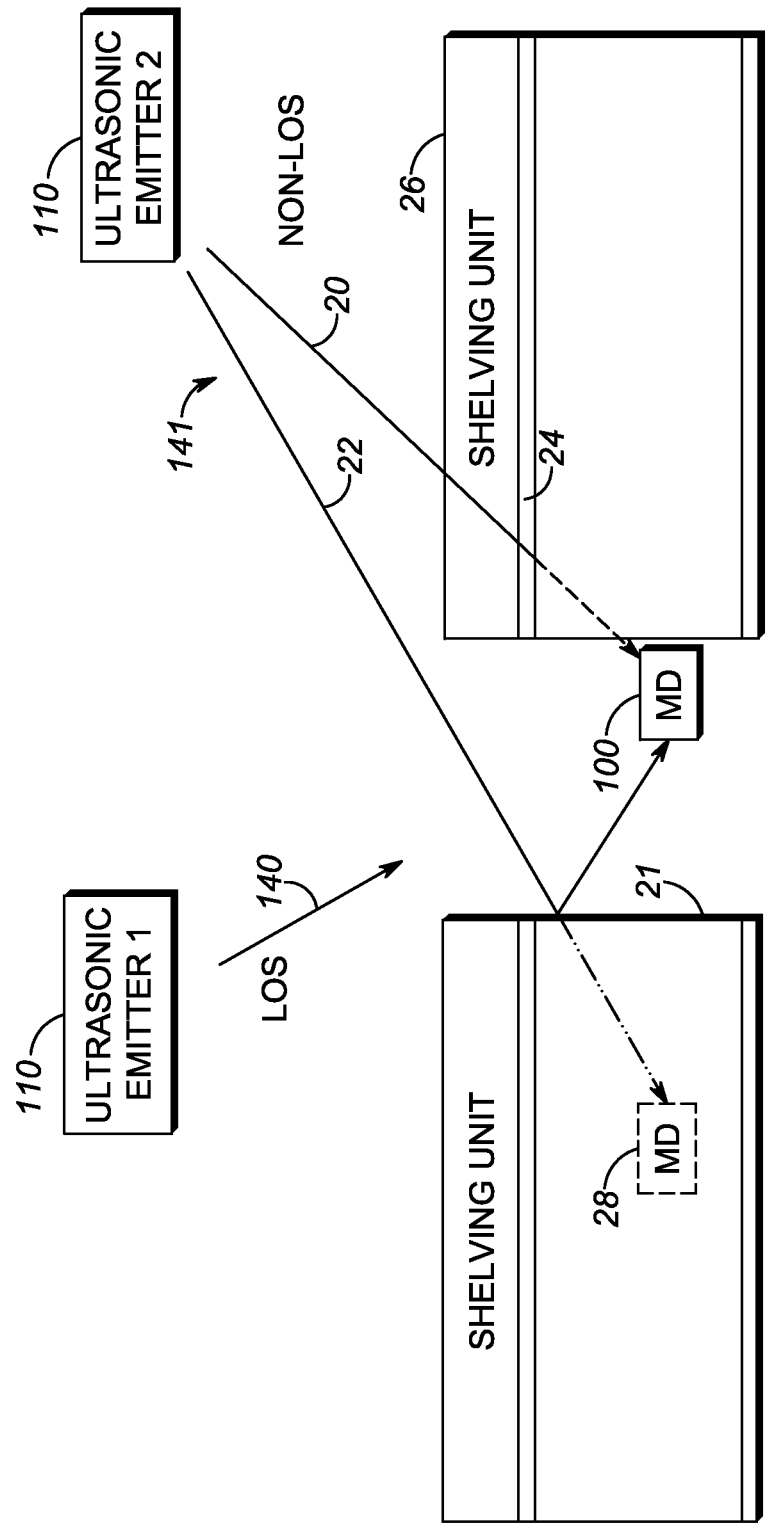
FIG. 2 is a side view of an indoor environment with emitters and associated direct and reflected signals therefrom, in accordance with some embodiments of the present invention.

Referring to FIG. 2, in practice, a typical retail environment includes shelving 26, racks 24 and other objects that make accurate locationing difficult due to reflections, multipath, and attenuation as described above. For example, if only a reflected signal 22 is detected, an improper location 28 of the mobile communication device can result. The present invention changes system performance for this non-line-of-sight (non-LOS) condition, where a mobile communication device 100 is not within the LOS of the emitter 110, with minimal impact on position update rate of the locationing engine. In the example shown, the mobile communication device 100 is in a non-LOS condition with respect to emitter 2, where the direct signal from that emitter passes through a shelf 24 (attenuator) making the amplitude of that direct signal 20 less than if the mobile communication device was in a LOS condition, such as is the case with emitter 1. Further, the reflected signals 22 may have a higher amplitude than the attenuated direct signal 20 which can result in an inaccurate location 28 of the device 100. The present invention determines that the mobile communication device 100 is in a non-LOS condition predictively, by tracking the position of the mobile communication device with respect to a predetermined three-dimensional model or planogram of the environment and the obstacles within the environment, as will be detailed below.

The techniques described herein are specific to a flight time based ultrasonic or radio frequency positioning system. In practice, due to obstructions 24, 26 or reflecting surfaces 21 in the environment and the nature of ultrasonic signals, the communication device can receive multiple copies (multipath) of the ultrasonic burst, including a direct path signal 20 and one or more reflected signals 22. However, it should be recognized that there is a subtle difference how multipath affects performance between ultrasonic flight time locationing and other systems such as radio frequency systems. For ultrasonic flight time systems, detection of the direct path signal 20 is critical to time the flight. Typically pulse widths are short enough such that the reflected signals 22 arrive after well after the direct path signal is detected by the mobile communication device. Inasmuch as the ultrasonic burst is very short, the communication device typically will detect these direct and reflected signals at discrete moments in time, i.e. the direct signal does not overlap the reflected signals. Whereas, multipath in an RF system can easily result in overlapping signals which are harder to discern.

The present invention addresses the problem of reflected, multipath, or attenuated signals that can result in inaccurate flight time or signal strength measurements, in order to provide an accurate location of the communication device. In particular, the present invention preemptively determines when the mobile communication device will be in a non-LOS condition and optimizes system performance to accommodate this problem, as will be detailed below.

In practice, the environment, such as a retail store, will have a planogram of the environment and the obstacles within the environment, from which a predetermined three-dimensional model of the space of the environment can be derived. Given this model, and the fixed ceiling location of the emitters, and assuming that a mobile communication device to be located and tracked is held at an average fixed height, it is possible to map the areas in the model for each emitter where a burst from that emitter will be attenuated, i.e. be in the shadow of an obstacle. For example, if the locationing engine of the system can provide recent, relatively accurate location information of the mobile communication device, the present invention can estimate the likelihood that a signal from a particular emitter will have a direct line of sight to the mobile communication device. If the mobile communication device is moving into a location in the environment where there is an obstructed signal (i.e. it is in a non-LOS condition) for a nearby emitter to be used for locationing, the present invention provides several techniques to optimize system performance by modifying a locationing system parameter to overcome that emitter's non-LOS problem, which it would not ordinarily be able to do without the prior knowledge of the environment model. The locationing system parameter can be modified by a locationing engine in the backend controller or in the mobile communication device. The locationing engine will have a stored copy of the model and map.

In one scenario, if the mobile communication device is in a non-LOS condition from an emitter and there is a reflecting surface from the model that can provide a strong signal reflection from this emitter towards the mobile communication device (which can result in a large locationing error) than any signal measurement from this emitter can be ignored. For example, if the model shows that there is a reflecting surface that will reflect a signal from an emitter in one position at a complementary angle directly to the location of the mobile communication device, then there is a likelihood that the reflection will provide a signal amplitude that is larger than the direct signal, resulting in a large locationing error. In this case, the signal from this emitter can be ignored, particularly if there are other nearby emitters in a direct LOS condition with the mobile communication device that can be used for more accurate locationing of the mobile communication device.

Figure 3:
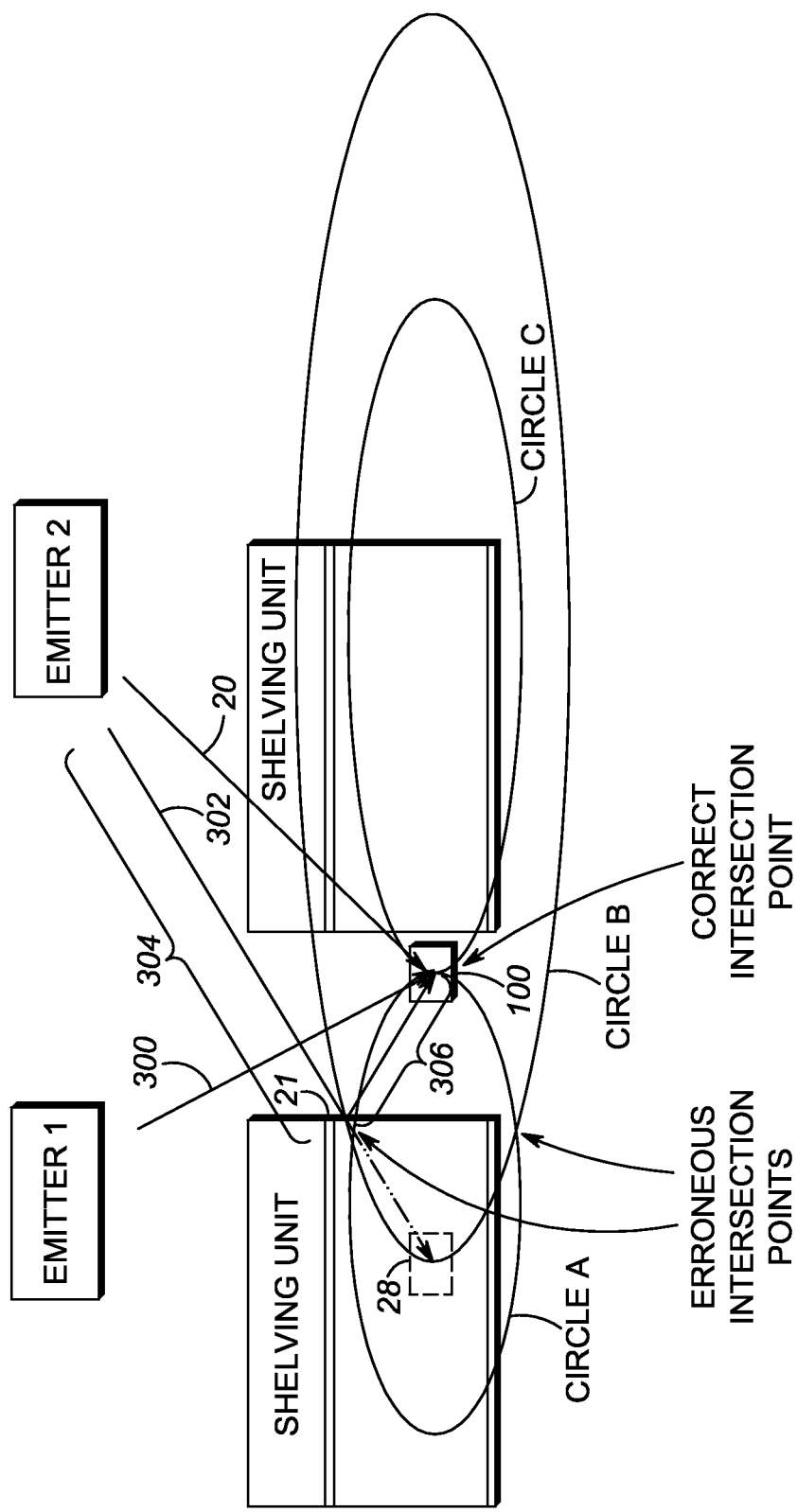
FIG. 3 is a side view of an indoor environment with emitters and associated direct and reflected signals therefrom, in accordance with other embodiments of the present invention.

In another scenario, if the mobile communication device is in a LOS condition from one emitter and a non-LOS condition from one other emitter and there is a reflecting surface from the model that can provide a strong signal reflection from this other emitter towards the mobile communication device than it is possible to calculate the true line of sight distance to the mobile device by transposing the mirror image of a reflected distance measurement. Referring to FIG. 3, start with a distance measurement 300 from ultrasonic emitter 1, which is known to be in a LOS condition with the mobile device 100. Given that accurate distance measurement, the device is assumed to be somewhere on a circle (A) on the listening plane representing all the possible locations of the mobile device at that distance 300 and being centered below the position of emitter 1. It is assumed that the mobile device is being carried by a person and is approximately four foot high above the ground plane (i.e. floor). Now consider the distance measurement 302 from ultrasonic emitter 2 which is not in a LOS condition with the mobile device 100. If it was not known that this distance measurement 302 was wrong, this would create a second circle of possible points (Circle B) centered under emitter 2 where the device could be believed to be located 28. Correlating the accurate distance 300 from emitter 1 and the incorrect distance 302 from emitter 2 would result in two possible erroneous locations of the mobile device at the intersection of Circles A and B. However, with knowledge of the floor plan including shelving positions, heights, etc., and that the mobile device is in a non-LOS condition with emitter 2, and that there is a strong reflective surface 21 in view from the model, it can be assumed that any flight time measurement from ultrasonic emitter 2 will be longer than the true line of sight distance (distance 302 instead of distance 20). Knowing that the device must exist somewhere on Circle A at a point that is visible to ultrasonic emitter 1 and not visible to ultrasonic emitter 2 will greatly narrow down the possible locations of the device. Using the knowledge of the dimensions of Circle A, along with the knowledge that the correct distance 20 must be less than the reflected distance 302 from the model, a possible mirror image location of device 100 can be calculated by subtracting the distance 304 from emitter 2 to reflective surface 21 from the distance measurement 302, and transposing a mirror image of this subtracted distance 306 from the reflective surface 21, resulting with a point on circle A. This new location provides a more accurate Circle C centered under emitter 2, which would result the correct position of the mobile device 100 at the intersection of Circle A and Circle C.

In another scenario, if the mobile communication device is in a non-LOS condition from an emitter and there is a reflecting surface from the model that is very close to the mobile communication device, this surface can provide a reflected signal from this emitter towards the mobile communication device which will result in only a small locationing error. Such a signal from this non-LOS emitter can be weighted more lightly than signals from LOS emitters, or the location of the mobile communication device determined using this compromised signal can be weighted less than locations determined using all LOS emitters. For example, if the model shows that there is a shelf near the mobile communication device that can reflect the emitter signal a short distance to the location of the mobile communication device, then there is a likelihood that the reflection will provide a signal amplitude that is larger than the direct signal, but would only resulting in a small locationing error. In this case, the signal from this emitter can be more lightly weighted than signals from other nearby emitters that are in a direct LOS condition with the mobile communication device. In this scenario, the actual weighting values can be determined empirically.

In another scenario, if the mobile communication device is in a non-LOS condition from an emitter and there is an intervening attenuator from the model that can attenuate of a signal from this emitter towards the mobile communication device (such that the signal may not be sufficient to trigger a detection threshold in the mobile communication device) than a sound pressure level (SPL) of this signal from the emitter can be increased in order to trigger the detection threshold in the mobile communication device. For example, if the model shows that there will be significant obstructions in line from the emitter to the mobile communication device (such as down an aisle that contains absorbing obstructions) the SPL can be turned up to provide additional power to "punch through" through attenuators so that the mobile communication device can detect the signal. Conversely, in scenarios when it is known that there are no obstructions in line with the mobile communication device (like an open floor plan area of a department store) the SPL can be turned down to the point detection is just possible in order to conserve power, reduce reverberation, and increase the update rate of the system since it is not necessary to wait as long for ultrasonic reverberations to die out, so ultrasonic bursts can occur more frequently. In this way, the present invention can adapt a transmit level of the emitter to provide a more accurate direct signal for ultrasonic locationing. In accordance with an ultrasonic embodiment of the present invention, each ultrasonic burst should last on the order of 2 ms in duration and will have an adjustable sound pressure level (SPL). For example, an ultrasonic locationing tone can be emitted at a higher (typically 10-15 dB higher) sound pressure level than normal in order to penetrate objects (i.e. attenuators) in the environment to provide a more accurate line-of-sight measurement instead of attenuated or reflected signals (i.e. multipath) which would give inaccurate flight time or signal strength measurements, and therefore an inaccurate location of the device. Similarly, RF beacon signals can be transmitted at higher power levels than normal RF traffic. This will provide a signal capable of penetrating intervening attenuators directly to the mobile communication device where the emitter or transmitter is in a non-LOS condition with the mobile communication device. In this way, the present invention increases the transmit power level of emitter ultrasonic bursts (e.g. ranging pulses) well beyond what is needed for LOS detection. As a result, the direct path signal of the ultrasonic burst penetrates through attenuators at levels that are still over the environmental noise level, giving adequate signal-to-noise ratio (SNR) for detection. In these scenarios, the transmit power level can be determined empirically such that the signal is just able to be detected by the mobile communication device.

In another scenario, if the mobile communication device is in a non-LOS condition from an emitter and there is an intervening attenuator from the model that can attenuate of a signal from this emitter towards the mobile communication device (such that the signal may not be sufficient to trigger a detection threshold in the mobile communication device) than the signal detection threshold can be decreased in order to trigger the detection of the signal in the mobile communication device. For example, if the model shows that there will be significant obstructions in line from the emitter to the mobile communication device (such as down an aisle that contains absorbing obstructions) the trigger detection threshold can be decreased so that the mobile communication device can detect the first arrival of the pulse, even when heavily attenuated and close to the noise floor. Conversely, in scenarios when it is known that there are no obstructions in line with the mobile communication device (like an open floor plan area of a department store) the trigger detection threshold can be increased to provide excellent noise immunity to false triggers. In these scenarios, the adapted trigger detection threshold can be determined empirically such that the signal is just able to be detected by the mobile communication device.

In another scenario, if a mobile communication device moves behind solid walls or shelving with little or no possibility for direct LOS detection, there is little that can be done with locationing system parameters in flight time mode that will make locationing work. In situations like these, it can be advantageous to change from flight time location mode to RSSI mode. RSSI mode is less accurate than flight time mode, but it can still detect the presence of the mobile communication device.

Figure 4:
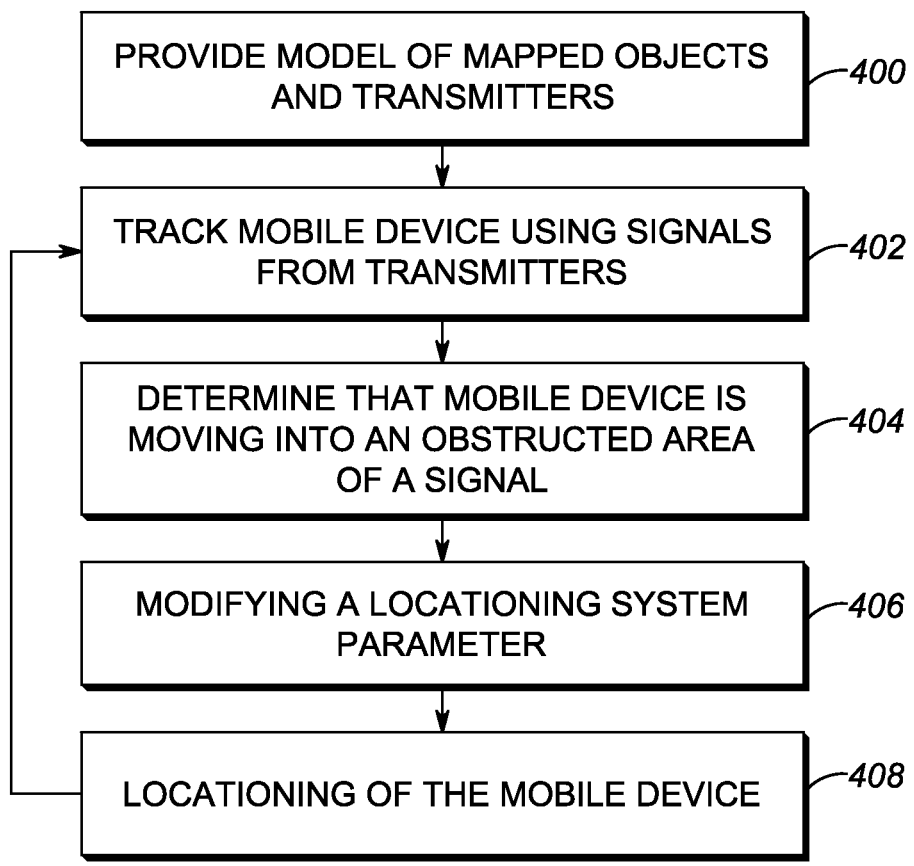
FIG. 4 is a flow diagram illustrating a method, in accordance with some embodiments of the present invention.

FIG. 4 is a flowchart illustrating a method for improved locationing system performance in non-line of sight conditions of a mobile communication device within an environment, according to some embodiments of the present invention.

A first step 400 includes providing a three-dimensional model of an environment including a map of a plurality of fixed transmitters within the environment. The transmitters can be affixed to a ceiling of the environment and oriented towards a floor of the environment to provide a limited region for communication devices to receive signals from the transmitters. The transmitters can be ultrasonic emitters or radio frequency transmitters. The model includes a map of objects positioned within the environment that are capable of obstructing the signals from the transmitters. The model also includes mapped areas where the signal from a nearby transmitter is obstructed. Nearby transmitters are those that would ordinarily be used for locating the mobile communication device.

A next step 402 includes tracking a location of a mobile communication device moving within the environment using the signals transmitted at predetermined times from the transmitters to the mobile communication device located within the environment. The transmitters can be local area radio frequency transmitters sending beacon signals or can by ultrasonic emitters sending ultrasonic burst signals having a frequency between 19 kHz and 22.05 kHz.

A next step 404 includes determining that the mobile communication device is moving into a mapped area having an obstructed signal (i.e. a non-LOS condition) from a nearby transmitter to be used for locating the mobile communication device.

A next step 406 includes modifying a locationing system parameter for that obstructed signal in a non-LOS condition. For example, modifying can include ignoring the obstructed signal. In another example, modifying includes weighting the modified locationing system parameter for the obstructed signal less than signals in a LOS condition. In another example, modifying includes adapting a transmit power level of the obstructed signal from the transmitter until an amplitude of the obstructed signal measures above a signal detection threshold in the mobile communication device. This can include increasing or decreasing the transmit power level. In another example, modifying includes adapting a signal detection threshold in the mobile communication device so that the obstructed signal can be detected by the mobile communication device. This can include increasing or decreasing the signal detection threshold until the signal is just able to be detected. In yet another example, modifying includes changing the locationing mode between a flight time mode and an RSSI mode signals.

A next step includes locationing 408 of the mobile communication device using at least the modified signal parameter, preferably along with direct signals, that can provide time-of-flight information or signal strength information that can be used by a locationing engine in the mobile communication device itself or the backend controller to locate the communication device.

The above steps can be repeated periodically to keep track 402 of mobile communication devices moving within, entering, or leaving the environment.

Advantageously, the present invention provides the system designer with the ability to actively change locationing system parameters, preemptively, based on the likelihood of line of sight obstructions. Previous solutions waited until system performance was adversely affected before changes were made in an attempt to improve performance.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors or processing devices such as microprocessors, digital signal processors, customized processors and field programmable gate arrays and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits, in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc Read Only Memory, an optical storage device, a magnetic storage device, a Read Only Memory, a Programmable Read Only Memory, an Erasable Programmable Read Only Memory, an Electrically Erasable Programmable Read Only Memory, and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for improved locationing system performance in non-line of sight conditions of a mobile communication device within an environment, the system comprising:
  a model of the environment including a map of a plurality of fixed transmitters within the environment, the model also includes a map of objects positioned within the environment that are capable of obstructing the signals from the transmitters, and includes mapped areas where the signal from a nearby transmitter is obstructed;
  a locationing engine operable to track a location of a mobile communication device moving within the environment using the signals, determine that the mobile communication device is moving into a mapped area having an obstructed signal from a nearby transmitter to be used for locating the mobile communication device, modify a locationing system parameter for that obstructed signal, and locate the mobile communication device using at least the modified signal parameter; and
  wherein the locationing engine modifies the locationing system parameter includes one of (a) calculating an accurate line of sight distance based on transposing a mirror image of a reflected signal path measurement, (b) weighting the obstructed signal less than signals in a line-of-sight condition, and (c) increasing a transmit power level of the obstructed signal from the transmitter, and (d) decreasing a signal detection threshold in the mobile communication device.

2. The system of claim 1, wherein the locationing engine modifies the locationing system parameter by increasing the transmit power level of the obstructed signal from the transmitter until an amplitude of the obstructed signal measures above a signal detection threshold in the mobile communication device.

3. The system of claim 1, wherein the locationing engine modifies the locationing system parameter by decreasing a transmit power level of the signal from the transmitter when it is in a line-of-sight condition with the mobile communication device.

4. The system of claim 1, wherein the locationing engine modifies the locationing system parameter by decreasing the signal detection threshold in the mobile communication device so that the obstructed signal can be detected by the mobile communication device.

5. The system of claim 3, wherein the locationing engine modifies the locationing system parameter by increasing a signal detection threshold in the mobile communication device when the obstructed transmitter returns to a line-of-sight condition with the mobile communication device.

6. A system for improved locationing system performance in non-line of sight conditions of a mobile communication device within an environment, the system comprising:
  a model of the environment including a map of a plurality of fixed transmitters within the environment, the model also includes a map of objects positioned within the environment that are capable of obstructing the signals from the transmitters, and includes mapped areas where the signal from a nearby transmitter is obstructed;
  a locationing engine operable to track a location of a mobile communication device moving within the environment using the signals, determine that the mobile communication device is moving into a mapped area having an obstructed signal from a nearby transmitter to be used for locating the mobile communication device, modify a locationing system parameter for that obstructed signal, and locate the mobile communication device using at least the modified signal parameter; and
  wherein the locationing engine modifies the locationing system parameter by changing between flight time mode and RSSI mode signals for locationing of the mobile communication device.

7. The system of claim 1, wherein the transmitters are radio frequency transmitters of a local area network and the signals are beacons used for locationing of the mobile communication device.

8. The system of claim 1, wherein the transmitters are ultrasonic emitters and the signals are ultrasonic bursts used for locationing of the mobile communication device.

9. The system of claim 7, wherein the transmitters can be affixed to a ceiling of the environment and oriented towards a floor of the environment to provide a limited region for the mobile communication devices to receive the ultrasonic bursts, the ultrasonic bursts have a frequency between 19 kHz and 22.05 kHz, and the mobile communication device utilizes existing, unmodified audio circuitry to measure the signals from the ultrasonic bursts.

10. A locationing engine having improved locationing system performance in non-line of sight conditions of a mobile communication device within an environment, the engine comprising:

a model of the environment including a map of a plurality of fixed transmitters within the environment, the model also includes a map of objects positioned within the environment that are capable of obstructing the signals from the transmitters, and includes mapped areas where the signal from a nearby transmitter is obstructed; and a processor operable to track a location of a mobile communication device moving within the environment using the signals, determine that the mobile communication device is moving into a mapped area having an obstructed signal from a nearby transmitter to be used for locating the mobile communication device, modify a locationing system parameter for that obstructed signal, and locate the mobile communication device using at least the modified signal parameter;

wherein the processor operable to modify a locationing system parameter includes the processor configured for one of (a) calculating an accurate line of sight distance based on transposing a mirror image of a reflected signal path measurement, (b) weighting the modified locationing system parameter for the obstructed signal less than signals in a line-of-sight condition, (c) adapting a transmit power level of the obstructed signal from the transmitter, (d) adapting a signal detection threshold in the mobile communication device, and (e) changing between flight time mode and RSSI mode signals for the locationing step.

11. A method for improved locationing system performance in non-line of sight conditions of a mobile communication device within an environment, the method comprising the steps of:

providing a model of the environment including a map of a plurality of fixed transmitters within the environment, the model also includes a map of objects positioned within the environment that are capable of obstructing the signals from the transmitters, and includes mapped areas where the signal from a nearby transmitter is obstructed;

tracking a location of a mobile communication device moving within the environment using the signals from the plurality of fixed transmitters within the environment;

determining that the mobile communication device is moving into a mapped area having an obstructed signal from a nearby transmitter to be used for locating the mobile communication device;

modifying a locationing system parameter for that obstructed signal;

locationing of the mobile communication device using at least the modified signal parameter; and wherein the modifying includes one of (a) calculating an accurate line of sight distance based on transposing a mirror image of a reflected signal path measurement, (b) weighting the modified locationing system parameter for the obstructed signal less than signals in a line-of-sight condition, (c) adapting a transmit power level of the obstructed signal from the transmitter, (d) adapting a signal detection threshold in the mobile communication device, and (e) changing between flight time mode and RSSI mode signals for the locationing step.

12. The method of claim 11, wherein modifying includes adapting the transmit power level of the obstructed signal from the transmitter until an amplitude of the obstructed signal measures above a signal detection threshold in the mobile communication device.

13. The method of claim 11, wherein modifying includes adapting the signal detection threshold in the mobile communication device so that the obstructed signal can be detected by the mobile communication device.

* * * * *